2,885,380

United States Patent Office

Patented May 5, 1959

2,885,380

FLAME RESISTANT COMPOSITION COMPRISING CHLORINATED POLYESTER RESIN, INORGANIC OXIDE AND AN EPOXIDE RESIN AND METHOD OF PREPARING

Vito D. Elarde, Schiller Park, Ill., assignor to Western Electric Company, Incorporated, New York, N.Y., a corporation of New York No Drawing. Application October 11, 1955
Serial No. 539,928

4 Claims. (Cl. 260—40)

This invention relates to flame resistance epoxy-type resins and methods of making the same, and has for an object thereof the provision of flame resistant epoxy-type resins having highly chlorinated hydrocarbon fillers and methods of making the same.

Another object of the invention is to provide epoxy-type resins having flame-quenching fillers therein inert to curing agents of the resins and methods of making the same.

A further object of the invention is to provide epoxy-type resins having chlorinated polyester resin fillers and fillers of antimony trioxide to make the composition flame resistant and methods of making the same.

In the method illustrating certain features of the invention, an epoxy-type resin is polymerized by an amine while having amine-inert fillers therein of a substantially fully polymerized chlorinated polyester or hydrocarbon together with fillers of inorganic flame retardant compounds.

In a method forming a specific embodiment of the invention a chlorinated polyester resin is ground into powder form and, with antimony trioxide, is mixed with a liquid condensation product of bisphenol and epichlorohydrin and an aromatic amine, and the condensation product then is polymerized.

A complete understanding of the invention may be obtained from the following detailed description of compositions and methods forming specific embodiments thereof.

Flame resistant electrically insulating compositions suitable particularly for molding or casting an encapsulating waterproof sheath around electrical devices, such as, for example, capacitors, resistors, networks, or the like, include an epoxide as its major constituent. To make the flame resistant composition, a highly chlorinated polyester or hydrocarbon, such as for example, a high melting point, non-waxy, highly chlorinated hydrocarbon, such as a chlorinated polyester resin, a polyvinyl chloride, a copolymer of polyvinyl chloride and polyvinylidene chloride or chloroprene, is fully polymerized and is ground into suitable filler size particles. The chlorinated non-waxy hydrocarbon then is mixed with an inorganic flame retardant substance composed of an oxide or a sulfide of a heavy amphoteric element, such as, for example, bismuth oxide, arsenic oxide, antimony trioxide, bismuth sulfide, arsenic sulfide or antimony sulfide, to form a flame retarding mixture. The unpolymerized components of the epoxy-type or epoxide resin in syrup form and the flame retarding mixture are then mixed together. An amine curing agent in liquid state is mixed into the resulting mixture, and the composition is applied by molding, casting or painting to a core portion to form an encapsulating cover. The epoxide resin then is polymerized, by heat, if necessary, the chlorinated non-waxy hydrocarbon filler being sufficiently inert to the amine that there is no appreciable reaction between the amine and the chlorinated hydrocarbon during the polymerization of the epoxy compound, though the non-waxy hydrocarbon filler is sufficiently reactive to the epoxide that excellent bonding occurs therebetween. Suitable examples of the polyvinyl chloride, the copolymer of polyvinyl chloride and polyvinylidene chloride and chloroprene are those commonly used to form electrically insulating covers and jackets for electrical devices.

Suitable examples of the chlorinated polyester filler are:

*Example 1*

|  | Percent |
|---|---|
| Ethylene glycol | 7 |
| Diethylene glycol | 12 |
| Maleic anhydride | 11 |
| Hexachloroendomethylene tetrahydrophthalic acid | 43 |
| Styrene monomer | 27 |

*Example 2*

|  | Percent |
|---|---|
| Ethylene glycol | 8 |
| Diethylene glycol | 11 |
| Fumaric acid | 13 |
| Hexachloroendomethylene tetrahydrophthalic acid | 38 |
| Styrene monomer | 30 |

*Example 3*

|  | Percent |
|---|---|
| Ethylene glycol | 6 |
| Propylene glycol | 12 |
| Fumaric acid | 14 |
| Hexachloroendomethylene tetrahydrophthalic acid | 36 |
| Styrene monomer | 32 |

These mixtures are polymerized substantially completely and form fully polymerized esters of chlorinated dibasic acids and polyhydric alcohols. After the polymerization, the resulting polyester is ground into powder for suitable use as a filler, is mixed with the inorganic flame resistant compound, and is added in about twenty percent by weight to the liquid epoxy resin and polymerizing or curing agent. The resulting mixture is formed, molded or cast in the shape desired and the epoxide is fully polymerized without substantial reaction between the amine and the flame retarding mixture.

Highly satisfactory examples of epoxy or epoxide resins for this purpose are compounds formed by reacting in an alkaline solution of 45% to 70% bivalent phenol, such as, for example, hydroquinone, resorcin, bisphenol or a condensation product of one of these compounds with arylaliphatic- or cyclo-ketones, with 20% to 43% epichlorohydrin or one of its derivatives, with removal of water by vacuum distillation. 0% to 10% of a suitable thinner is added, and polymerization or curing of these compounds is accomplished by the addition of from 3% to 25% of an amine such as, for example, ethylene diamine, metaphenylene diamine, piperidine, trimethylene diamine or guanidine.

The class of resins known as epoxies are in general prepared by heating together a bivalent phenol with epichlorohydrin. This reaction is carried out in an alkaline medium to absorb the hydrochloric acid produced during the combination. After the reaction is completed the polyether formed is washed with water, to remove traces of salt, and water not mechanically separable is removed by vacuum distillation. The polyether is then thinned to the desired working viscosity and is ready to be polymerized by the addition of the amine. The resin should be composed of diphenol from 45% to 70%, epichlorohydrin from 20% to 43%, a thinner from 0% to 10% and an amine from 3% to 25%. For use in the encapsulation of electrical components, the epoxy resin used should have the following characteristics in the cured state:

Modulus of rupture (ASTM D790) --- $10\text{–}15 \times 10^3$ p.s.i.
Modulus of Elasticity (ASTM D790) - $3\text{–}6 \times 10^5$ p.s.i.
Hardness (Barcol) ---------------- 30–50
Shrinkage during cure ------------ Below 4%
Heat distortion temperature ------ Above 150° F.

Epoxy resins suitable for forming the main components of the compositions are:

Example 1

| | Percent |
|---|---|
| Bisphenol A | 63 |
| Epichlorohydrin | 26 |
| Thinner | 5 |
| Metaphenylene diamine | 6 |

Example 2

| | |
|---|---|
| Hydroquinone | 50 |
| Epichlorohydrin | 42 |
| Thinner | 3 |
| Ethylene diamine | 5 |

Example 3

| | |
|---|---|
| Resorcinol | 48 |
| Epichlorohydrin | 40 |
| Thinner | 8 |
| Piperidine | 4 |

The proportion of the filler of the chlorinated hydrocarbon to the remainder of the entire composition should be such that the chlorine is present to the extent of at least 4% by weight of the entire composition, and the proportion of the inorganic flame retarding compound to the remainder of the entire composition should be such that there is sufficient amphoteric element to combine with all the chlorine. For example, a very successful flame resistant composition was made by mixing four parts by weight of an unpolymerized epoxide with one and one-half parts by weight of a polymerized chlorinated polyester resin and one part by weight of antimony trioxide. A curing amine was mixed into this mixture to the extent of one part by weight, and the resulting composition was molded around an article.

During the polymerization of the epoxy resins by the amines, there is no substantial reaction of the amines with the flame retarding mixtures even though chlorine is present in large quantities and the amines are initially free. This is avoided by having the chlorine in substantially fully polymerized hydrocarbons so that the chlorine is unavailable. However, when the resulting composition is subjected to an igniting temperature, the chlorine is readily released along with the heavy amphoteric metal of the flame retarding mixture to smother flames from the composition. Also, the flame retarding filler of fully polymerized non-waxy hydrocarbons bonds excellently with the epoxide components so that the excellent sealing and waterproofing qualities of the epoxide resins are not impaired by the filler.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A flame resistant composition comprising by weight one and one-half parts of a highly chlorinated polymerized polyester resin prepared from hexachloroendomethylene tetrahydrophthalic acid, a mixture of glycols selected from the group consisting of ethylene glycol, diethylene glycol, and propylene glycol, a compound selected from the group consisting of maleic anhydride and fumaric acid and styrene, the hexachloroendomethylene tetrahydrophthalic acid being present in an amount of from 36 percent to 43 percent based on the total weight of the polyester components; one part of an inorganic flame retardant composed of an oxide selected from the group consisting of bismuth oxide, arsenic oxide and antimony trioxide; four parts of an epoxide resin formed by reacting 45 percent to 70 percent bivalent phenol with 20 percent to 43 percent epichlorohydrine and one part of an amine selected from the group consisting of ethylene diamine, metaphenylene diamine, piperidine, trimethylene diamine, and guanidine.

2. A flame resistant composition comprising by weight one and one-half parts of a highly chlorinated polymerized polyester resin prepared from hexachloroendomethylene tetrahydrophthalic acid, a mixture of glycols selected from the group consisting of ethylene glycol, diethylene glycol, and propylene glycol, a compound selected from the group consisting of maleic anhydride and fumaric acid and styrene, the hexachloroendomethylene tetrahydrophthalic acid being present in an amount of from 36 percent to 43 percent based on the total weight of the polyester components; one part of antimony trioxide and five parts of an epoxide resin formed by reacting 45 percent to 70 percent bivalent phenol with 20 precent to 43 percent of epichlorohydrin and then curing with 3 percent to 25 percent metaphenylene diamine.

3. A flame resistant composition comprising by weight one and one-half parts of a highly chlorinated polymerized polyester resin prepared from hexachloroendomethylene tetrahydrophthalic acid, a mixture of glycols selected from the group consisting of ethylene glycol, diethylene glycol, and propylene glycol, a compound selected from the group consisting of maleic anhydride and fumaric acid and styrene, the hexachloroendomethylene tetrahydrophthalic acid being present in an amount of from 36 percent to 43 percent based on the total weight of the polyester components; one part of an inorganic flame retardant composed of antimony trioxide; four parts of an epoxide resin formed by reacting 45 percent to 70 percent bivalent phenol with 20 percent to 43 percent epichlorohydrine and one part of piperidine.

4. The method of preparing a flame resistant composition which comprises powdering one and one-half parts of a polymerized chlorinated polyester resin prepared from hexachloroendomethylene tetrahydrophthalic acid, a mixture of glycols selected from the group consisting of ethylene glycol, diethylene glycol, and propylene glycol, a compound selected from the group consisting of maleic anhydride and fumaric acid and styrene, the hexachloroendomethylene tetrahydrophthalic acid being present in an amount of from 36 percent to 43 percent based on the total weight of the polyester components; mixing one part of antimony trioxide therein; adding four parts of liquid epoxide resin formed by reacting 45 percent to 70 percent bivalent phenol with 20 percent to 43 percent of epichlorohydrine with one part of an amine selected from the group consisting of ethylene diamine, metaphenylene diamine, piperidine, trimethylene diamine, and guanidine; and then curing the entire composition.

References Cited in the file of this patent

UNITED STATES PATENTS

| | | |
|---|---|---|
| 2,717,216 | Arone | Sept. 6, 1955 |
| 2,779,701 | Robitschek et al. | Jan. 29, 1957 |
| 2,783,215 | Robitschek et al. | Feb. 26, 1957 |